United States Patent
Murthy

(10) Patent No.: US 10,650,080 B2
(45) Date of Patent: *May 12, 2020

(54) MANAGING COMPOUND XML DOCUMENTS IN A REPOSITORY

(71) Applicant: Oracle International Corporation, Redwood Shores, CA (US)

(72) Inventor: Ravi Murthy, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 14/873,748

(22) Filed: Oct. 2, 2015

(65) Prior Publication Data

US 2016/0026731 A1 Jan. 28, 2016

Related U.S. Application Data

(63) Continuation of application No. 11/807,939, filed on May 29, 2007, now Pat. No. 9,183,321.

(Continued)

(51) Int. Cl.
*G06F 16/958* (2019.01)
*G06F 16/93* (2019.01)
(Continued)

(52) U.S. Cl.
CPC .......... *G06F 16/986* (2019.01); *G06F 16/835* (2019.01); *G06F 16/94* (2019.01);
(Continued)

(58) Field of Classification Search
CPC .................. G06F 17/2247; G06F 17/2229
See application file for complete search history.

(56) References Cited

U.S. PATENT DOCUMENTS

| | | |
|---|---|---|
| 5,047,918 A | 9/1991 | Schwartz et al. |
| 5,202,982 A | 4/1993 | Gramlich et al. |

(Continued)

FOREIGN PATENT DOCUMENTS

| | | |
|---|---|---|
| EP | 0 856 803 A2 | 8/1998 |
| WO | WO 97/46956 A1 | 12/1997 |

(Continued)

OTHER PUBLICATIONS

Hwe-Mo Kim, Kyong-Ho Lee, "Device-independent web browsing based on CC/PP and annotation", Interacting with Computers, vol. 18, Issue 2, Mar. 1, 2006, pp. 283-303, https://doi.org/10.1016/j.intcom.2005.03.006.*

(Continued)

*Primary Examiner* — Scott T Baderman
*Assistant Examiner* — Benjamin Smith
(74) *Attorney, Agent, or Firm* — Hickman Palermo Becker Bingham LLP

(57) ABSTRACT

A declarative mechanism is used to manage large documents within a repository. The large documents are sectioned into subdocuments that are linked together by a parent document. The combination of the parent document and subdocument is referred to as a compound document. There are multiple options for configuring rules to break up a source document into a compound document and naming the subdocuments. The compound documents may be queried using statements that treat the compound document as a single XML document, or the parent document of a subdocument may be queried and treated independently. Access control and versioning can be applied at the finer granularity of the subdocument.

18 Claims, 3 Drawing Sheets

Related U.S. Application Data

(60) Provisional application No. 60/829,652, filed on Oct. 16, 2006.

(51) Int. Cl.
*G06F 16/835* (2019.01)
*G06F 16/955* (2019.01)
*G06F 40/14* (2020.01)
*G06F 40/131* (2020.01)

(52) U.S. Cl.
CPC ........ *G06F 16/9558* (2019.01); *G06F 40/131* (2020.01); *G06F 40/14* (2020.01)

(56) References Cited

U.S. PATENT DOCUMENTS

| | | | |
|---|---|---|---|
| 5,210,686 A | 5/1993 | Jernigan | |
| 5,257,366 A | 10/1993 | Adair et al. | |
| 5,295,256 A | 3/1994 | Bapat | |
| 5,303,379 A * | 4/1994 | Khoyi | G06F 8/76 717/166 |
| 5,307,490 A | 4/1994 | Davidson et al. | |
| 5,369,763 A | 11/1994 | Biles | |
| 5,388,257 A | 2/1995 | Bauer | |
| 5,410,691 A | 4/1995 | Taylor | |
| 5,454,101 A | 9/1995 | Mackay et al. | |
| 5,463,772 A | 10/1995 | Thompson et al. | |
| 5,467,471 A | 11/1995 | Bader | |
| 5,499,371 A | 3/1996 | Henninger et al. | |
| 5,504,892 A | 4/1996 | Atsatt et al. | |
| 5,524,240 A | 6/1996 | Barbara et al. | |
| 5,530,849 A | 6/1996 | Hanushevsky et al. | |
| 5,544,360 A | 8/1996 | Lewak et al. | |
| 5,546,571 A | 8/1996 | Shan et al. | |
| 5,561,763 A | 10/1996 | Eto et al. | |
| 5,566,331 A | 10/1996 | Irwin, Jr. et al. | |
| 5,568,640 A | 10/1996 | Nishiyama et al. | |
| 5,574,915 A | 11/1996 | Lemon et al. | |
| 5,680,614 A | 10/1997 | Bakuya et al. | |
| 5,682,524 A | 10/1997 | Freund et al. | |
| 5,684,990 A | 11/1997 | Boothby | |
| 5,689,706 A | 11/1997 | Rao et al. | |
| 5,701,467 A | 12/1997 | Freeston | |
| 5,737,736 A | 4/1998 | Chang | |
| 5,758,153 A | 5/1998 | Atsatt et al. | |
| 5,778,179 A | 7/1998 | Kanai et al. | |
| 5,802,518 A | 9/1998 | Karaev et al. | |
| 5,819,275 A | 10/1998 | Badger et al. | |
| 5,822,511 A | 10/1998 | Kashyap et al. | |
| 5,825,353 A | 10/1998 | Will | |
| 5,832,526 A | 11/1998 | Schuyler | |
| 5,832,527 A * | 11/1998 | Kawaguchi | G06F 16/10 |
| 5,838,965 A | 11/1998 | Kavanagh et al. | |
| 5,842,212 A | 11/1998 | Ballurio et al. | |
| 5,848,246 A | 12/1998 | Gish | |
| 5,878,415 A | 3/1999 | Olds | |
| 5,878,434 A | 3/1999 | Draper et al. | |
| 5,892,535 A | 4/1999 | Allen et al. | |
| 5,915,253 A | 6/1999 | Christiansen | |
| 5,917,492 A | 6/1999 | Bereiter et al. | |
| 5,918,225 A | 6/1999 | White et al. | |
| 5,921,582 A | 7/1999 | Gusack | |
| 5,937,406 A | 8/1999 | Balabine et al. | |
| 5,974,407 A | 10/1999 | Sacks | |
| 5,978,791 A | 11/1999 | Farber et al. | |
| 5,991,771 A | 11/1999 | Falls et al. | |
| 5,999,942 A * | 12/1999 | Talati | G06F 8/10 |
| 6,021,414 A | 2/2000 | Fuller | |
| 6,023,706 A | 2/2000 | Schmuck et al. | |
| 6,029,160 A | 2/2000 | Cabrera et al. | |
| 6,029,166 A | 2/2000 | Mutalik et al. | |
| 6,029,175 A | 2/2000 | Chow et al. | |
| 6,044,378 A | 3/2000 | Gladney | |
| 6,052,122 A | 4/2000 | Sutcliffe et al. | |
| 6,088,694 A | 7/2000 | Burns et al. | |
| 6,092,086 A | 7/2000 | Martin et al. | |
| 6,101,500 A | 8/2000 | Lau | |
| 6,111,578 A | 8/2000 | Tesler | |
| 6,112,209 A | 8/2000 | Gusack | |
| 6,115,741 A | 9/2000 | Domenikos et al. | |
| 6,119,118 A | 9/2000 | Kain, III et al. | |
| 6,128,610 A | 10/2000 | Srinivasan | |
| 6,182,121 B1 | 1/2001 | Wlaschin | |
| 6,185,574 B1 | 2/2001 | Howard et al. | |
| 6,192,273 B1 | 2/2001 | Igel et al. | |
| 6,192,373 B1 | 2/2001 | Haegele | |
| 6,208,993 B1 | 3/2001 | Shadmon | |
| 6,212,512 B1 | 4/2001 | Barney et al. | |
| 6,212,557 B1 | 4/2001 | Oran | |
| 6,230,310 B1 | 5/2001 | Arrouye et al. | |
| 6,233,729 B1 | 5/2001 | Campara et al. | |
| 6,236,988 B1 | 5/2001 | Aldred | |
| 6,247,024 B1 | 6/2001 | Kincaid | |
| 6,279,007 B1 | 8/2001 | Uppala | |
| 6,301,605 B1 | 10/2001 | Napolitano et al. | |
| 6,314,408 B1 | 11/2001 | Salas et al. | |
| 6,314,425 B1 * | 11/2001 | Serbinis | G06F 21/6218 |
| 6,321,219 B1 | 11/2001 | Gainer et al. | |
| 6,339,382 B1 | 1/2002 | Arbinger et al. | |
| 6,349,295 B1 | 2/2002 | Tedesco et al. | |
| 6,366,921 B1 | 4/2002 | Hansen et al. | |
| 6,366,988 B1 | 4/2002 | Skiba et al. | |
| 6,370,537 B1 | 4/2002 | Gilbert et al. | |
| 6,370,548 B1 | 4/2002 | Bauer et al. | |
| 6,389,427 B1 | 5/2002 | Faulkner | |
| 6,389,433 B1 | 5/2002 | Bolosky et al. | |
| 6,393,435 B1 | 5/2002 | Gartner et al. | |
| 6,393,456 B1 | 5/2002 | Ambler et al. | |
| 6,397,231 B1 | 5/2002 | Salisbury et al. | |
| 6,421,692 B1 | 7/2002 | Milne et al. | |
| 6,430,563 B1 * | 8/2002 | Fritz | G06F 8/71 707/694 |
| 6,438,550 B1 | 8/2002 | Doyle et al. | |
| 6,442,548 B1 | 8/2002 | Balabine et al. | |
| 6,446,091 B1 | 9/2002 | Noren et al. | |
| 6,446,093 B2 * | 9/2002 | Tabuchi | G06F 21/6218 707/959 |
| 6,457,007 B1 | 9/2002 | Kikuchi et al. | |
| 6,457,065 B1 | 9/2002 | Rich et al. | |
| 6,487,469 B1 | 11/2002 | Formenti | |
| 6,493,742 B1 | 12/2002 | Holland et al. | |
| 6,532,488 B1 | 3/2003 | Ciarlante et al. | |
| 6,538,673 B1 * | 3/2003 | Maslov | G06F 17/2229 715/853 |
| 6,578,078 B1 * | 6/2003 | Smith | G06F 16/958 709/224 |
| 6,587,873 B1 | 7/2003 | Nobakht et al. | |
| 6,594,675 B1 | 7/2003 | Schneider | |
| 6,596,030 B2 * | 7/2003 | Ball | G06F 16/957 715/234 |
| 6,604,100 B1 | 8/2003 | Fernandez et al. | |
| 6,611,843 B1 | 8/2003 | Jacobs | |
| 6,636,845 B2 | 10/2003 | Chau et al. | |
| 6,681,221 B1 | 1/2004 | Jacobs | |
| 6,725,212 B2 | 4/2004 | Couch et al. | |
| 6,857,102 B1 * | 2/2005 | Bickmore | G06F 17/2247 715/205 |
| 6,871,321 B2 * | 3/2005 | Wakayama | G06F 16/958 715/234 |
| 6,925,599 B2 * | 8/2005 | Wood | G06F 17/21 715/229 |
| 6,941,510 B1 * | 9/2005 | Ozzie | G06F 17/2205 715/234 |
| 6,947,940 B2 * | 9/2005 | Anderson | G06F 16/10 707/613 |
| 6,959,416 B2 | 10/2005 | Manning et al. | |
| 6,973,458 B1 * | 12/2005 | Maeda | G06Q 10/10 |
| 6,993,527 B1 * | 1/2006 | Raman | G06F 16/80 715/237 |
| 7,036,076 B2 * | 4/2006 | Anwar | G06F 3/1206 715/255 |
| 7,043,472 B2 | 5/2006 | Aridor et al. | |
| 7,072,896 B2 | 7/2006 | Lee et al. | |

(56) References Cited

U.S. PATENT DOCUMENTS

| | | | |
|---|---|---|---|
| 7,096,224 B2 | 8/2006 | Murthy et al. | |
| 7,103,604 B2* | 9/2006 | Maeda | G06Q 10/10 |
| 7,103,915 B2* | 9/2006 | Redlich | G06F 21/6209 |
| | | | 713/166 |
| 7,117,216 B2 | 10/2006 | Chakraborty | |
| 7,134,071 B2* | 11/2006 | Ohwada | G06F 16/93 |
| | | | 715/229 |
| 7,143,181 B2* | 11/2006 | Koka | H04L 29/06 |
| | | | 709/236 |
| 7,210,097 B1* | 4/2007 | Clarke | G06F 16/88 |
| | | | 715/227 |
| 7,210,100 B2* | 4/2007 | Berger | H04L 29/06 |
| | | | 715/229 |
| 7,275,066 B2* | 9/2007 | Priestley | G06F 16/958 |
| | | | 707/800 |
| 7,280,995 B1 | 10/2007 | Sedlar | |
| 7,281,206 B2* | 10/2007 | Schnelle | G06F 16/86 |
| | | | 715/227 |
| 7,290,205 B2* | 10/2007 | Moncsko | G06F 16/9558 |
| | | | 715/208 |
| 7,369,260 B2* | 5/2008 | Buschi | G06Q 10/107 |
| | | | 358/1.15 |
| 7,398,466 B2* | 7/2008 | Jeon | G06F 17/2247 |
| | | | 715/229 |
| 7,430,711 B2* | 9/2008 | Rivers-Moore | G06F 17/248 |
| | | | 715/221 |
| 7,433,870 B2* | 10/2008 | Chan | G06F 21/6245 |
| 7,461,158 B2* | 12/2008 | Rider | H04L 63/10 |
| | | | 709/229 |
| 7,484,171 B2* | 1/2009 | Jeon | G06F 17/2247 |
| | | | 715/229 |
| 7,491,074 B1* | 2/2009 | Lai | G06K 7/0021 |
| | | | 439/159 |
| 7,509,306 B2* | 3/2009 | Boettiger | G06F 16/951 |
| 7,529,726 B2* | 5/2009 | Teng | G06F 16/83 |
| 7,530,014 B2* | 5/2009 | Abe | G06F 17/2211 |
| | | | 715/233 |
| 7,539,985 B2* | 5/2009 | Marvin | G06F 8/71 |
| | | | 717/170 |
| 7,555,564 B2* | 6/2009 | Gimson | G06F 16/9577 |
| | | | 709/245 |
| 7,581,177 B1* | 8/2009 | Mollicone | G06F 17/2247 |
| | | | 715/243 |
| 7,610,304 B2* | 10/2009 | Jain | G06F 16/24562 |
| 7,610,315 B2* | 10/2009 | Chang | G06F 21/62 |
| 7,650,324 B2* | 1/2010 | Dhairyawan | G06F 17/21 |
| | | | 715/215 |
| 7,669,114 B2* | 2/2010 | Wood | G06F 17/21 |
| | | | 715/205 |
| 7,672,946 B2* | 3/2010 | Kudo | G06F 21/6227 |
| | | | 707/783 |
| 7,673,235 B2* | 3/2010 | Bailey | G06F 17/2229 |
| | | | 715/243 |
| 7,711,702 B2* | 5/2010 | Smolen | G06F 16/2308 |
| | | | 707/715 |
| 7,721,193 B2* | 5/2010 | Upton | G06F 9/541 |
| | | | 715/234 |
| 7,735,062 B2* | 6/2010 | de Seabra e Melo | G06F 9/451 |
| | | | 717/120 |
| 7,752,632 B2* | 7/2010 | Villaron | G06F 17/24 |
| | | | 715/209 |
| 7,793,216 B2* | 9/2010 | Hale | G06F 17/2229 |
| | | | 715/252 |
| 7,797,310 B2* | 9/2010 | Idicula | G06F 16/8365 |
| | | | 707/719 |
| 7,805,452 B2* | 9/2010 | Kano | G06F 17/211 |
| | | | 707/708 |
| 7,827,177 B2* | 11/2010 | Murthy | G06F 16/83 |
| | | | 707/736 |
| 7,836,078 B2* | 11/2010 | Dettinger | G06F 21/6218 |
| | | | 707/713 |
| 7,913,172 B2* | 3/2011 | Rjaibi | G06F 16/83 |
| | | | 715/741 |
| 7,933,935 B2* | 4/2011 | Idicula | G06F 16/83 |
| | | | 707/811 |
| 7,937,398 B2* | 5/2011 | Murthy | G06F 16/83 |
| | | | 707/755 |
| 7,954,048 B2* | 5/2011 | Gauthier | G06F 17/218 |
| | | | 715/229 |
| 8,010,887 B2* | 8/2011 | Soria, Jr. | G06F 16/219 |
| | | | 715/229 |
| 8,082,266 B2* | 12/2011 | Boettiger | G06F 16/951 |
| | | | 707/769 |
| 8,271,428 B2* | 9/2012 | Hacigumus | G06F 16/86 |
| | | | 707/602 |
| 8,341,514 B2* | 12/2012 | Westerinen | G06F 16/986 |
| | | | 715/234 |
| 8,347,313 B2* | 1/2013 | Hare | G06Q 10/107 |
| | | | 719/313 |
| 8,356,053 B2* | 1/2013 | Murthy | G06F 16/86 |
| | | | 707/781 |
| 9,183,321 B2* | 11/2015 | Murthy | G06F 17/2247 |
| 9,880,980 B2* | 1/2018 | Petri | G06F 17/227 |
| 2002/0056025 A1 | 5/2002 | Qui et al. | |
| 2002/0059459 A1* | 5/2002 | Koka | H04L 29/06 |
| | | | 709/246 |
| 2002/0062325 A1* | 5/2002 | Berger | H04L 29/06 |
| | | | 715/229 |
| 2002/0065848 A1* | 5/2002 | Walker | G06F 17/24 |
| | | | 715/205 |
| 2002/0073056 A1 | 6/2002 | Broster et al. | |
| 2002/0091734 A1* | 7/2002 | Redlich | G06F 21/6209 |
| | | | 715/234 |
| 2002/0099739 A1* | 7/2002 | Fischer | G06F 16/9577 |
| | | | 715/239 |
| 2002/0120648 A1* | 8/2002 | Ball | G06F 16/957 |
| | | | 715/234 |
| 2002/0133484 A1 | 9/2002 | Chau et al. | |
| 2002/0156803 A1* | 10/2002 | Maslov | G06F 17/2229 |
| | | | 715/234 |
| 2002/0184401 A1 | 12/2002 | Kadel, Jr. et al. | |
| 2002/0188638 A1* | 12/2002 | Hamscher | G06F 17/243 |
| | | | 715/255 |
| 2003/0004937 A1 | 1/2003 | Salmenkaita et al. | |
| 2003/0009563 A1* | 1/2003 | Douglis | H04L 29/06 |
| | | | 709/227 |
| 2003/0014384 A1* | 1/2003 | Ewald | G06F 16/93 |
| 2003/0018650 A1* | 1/2003 | Priestley | G06F 16/958 |
| 2003/0065659 A1 | 4/2003 | Agarwal et al. | |
| 2003/0070143 A1* | 4/2003 | Maslov | G06F 17/2229 |
| | | | 715/255 |
| 2003/0079180 A1* | 4/2003 | Cope | G06Q 10/06 |
| | | | 715/229 |
| 2003/0084056 A1 | 5/2003 | DeAnna et al. | |
| 2003/0101194 A1 | 5/2003 | Rys et al. | |
| 2003/0115547 A1* | 6/2003 | Ohwada | G06F 16/93 |
| | | | 715/229 |
| 2003/0177443 A1* | 9/2003 | Schnelle | G06F 16/86 |
| | | | 715/227 |
| 2003/0189593 A1* | 10/2003 | Yarvin | G06F 16/9577 |
| | | | 715/762 |
| 2003/0195865 A1 | 10/2003 | Long et al. | |
| 2003/0200197 A1 | 10/2003 | Long et al. | |
| 2003/0237052 A1* | 12/2003 | Danielsson | G06F 16/9577 |
| | | | 715/236 |
| 2004/0043758 A1 | 3/2004 | Sorvari et al. | |
| 2004/0064466 A1 | 4/2004 | Manikutty et al. | |
| 2004/0068509 A1* | 4/2004 | Garden | G06F 16/258 |
| 2004/0068696 A1* | 4/2004 | Seyrat | H03M 7/30 |
| | | | 715/234 |
| 2004/0083479 A1* | 4/2004 | Bondarenko | G06F 9/546 |
| | | | 719/310 |
| 2004/0088332 A1* | 5/2004 | Lee | G06Q 10/10 |
| 2004/0088652 A1* | 5/2004 | Abe | G06F 17/2211 |
| | | | 715/230 |
| 2004/0103282 A1 | 5/2004 | Meier et al. | |
| 2004/0107214 A1* | 6/2004 | Hung | G06F 16/951 |
| 2004/0122831 A1* | 6/2004 | Ha | G06F 17/2229 |

(56) References Cited

U.S. PATENT DOCUMENTS

| | | | |
|---|---|---|---|
| 2004/0143791 A1 | 7/2004 | Ito et al. | |
| 2004/0148567 A1* | 7/2004 | Jeon | G06F 17/2247 715/237 |
| 2004/0176958 A1 | 9/2004 | Salmenkaita et al. | |
| 2004/0193607 A1* | 9/2004 | Kudo | G06F 21/6227 |
| 2004/0194016 A1* | 9/2004 | Liggitt | G06F 17/2247 715/234 |
| 2004/0225680 A1 | 11/2004 | Cameron et al. | |
| 2004/0230576 A1* | 11/2004 | Hillberg | G06F 16/116 |
| 2004/0237035 A1* | 11/2004 | Cummins | G06F 21/6209 715/234 |
| 2004/0268305 A1 | 12/2004 | Hogg et al. | |
| 2005/0041040 A1* | 2/2005 | Fukuda | G06F 17/212 345/619 |
| 2005/0052692 A1* | 3/2005 | Buschi | G06Q 10/107 358/1.15 |
| 2005/0076030 A1* | 4/2005 | Hada | G06F 21/6227 |
| 2005/0091581 A1* | 4/2005 | Bezrukov | G06F 17/2229 715/205 |
| 2005/0114692 A1* | 5/2005 | Watson-Luke | G06Q 20/367 726/26 |
| 2005/0120298 A1* | 6/2005 | Petrujkic | G06F 17/2229 705/7.13 |
| 2005/0125395 A1* | 6/2005 | Boettiger | G06F 16/951 |
| 2005/0149729 A1* | 7/2005 | Zimmer | G06F 21/575 713/168 |
| 2005/0177543 A1* | 8/2005 | Chen | G06F 17/2725 |
| 2005/0177784 A1* | 8/2005 | Andrews | G06F 17/2229 715/234 |
| 2005/0193382 A1* | 9/2005 | Goring | G06F 8/65 717/162 |
| 2005/0228728 A1* | 10/2005 | Stromquist | G06F 9/44505 705/30 |
| 2005/0256893 A1* | 11/2005 | Perry | G06F 16/9027 |
| 2005/0257201 A1* | 11/2005 | Rose | G06F 16/80 717/136 |
| 2005/0262129 A1* | 11/2005 | Hacigumus | G06F 16/86 |
| 2005/0278289 A1* | 12/2005 | Gauweiler | H03M 7/30 |
| 2005/0278616 A1* | 12/2005 | Eller | G06F 17/2247 715/234 |
| 2005/0289446 A1* | 12/2005 | Moncsko | G06F 16/9558 715/208 |
| 2006/0004780 A1* | 1/2006 | Maeda | G06Q 10/10 |
| 2006/0031411 A1* | 2/2006 | Gimson | G06F 16/9577 709/219 |
| 2006/0095834 A1* | 5/2006 | Jeon | G06F 17/2247 715/229 |
| 2006/0117014 A1* | 6/2006 | Qi | G06F 21/6218 |
| 2006/0136827 A1* | 6/2006 | Villaron | G06F 17/218 715/730 |
| 2006/0137019 A1* | 6/2006 | Dettinger | G06F 21/6218 726/27 |
| 2006/0143177 A1* | 6/2006 | Idicula | G06F 16/10 |
| 2006/0143557 A1* | 6/2006 | Chan | G06F 21/6245 715/239 |
| 2006/0143558 A1* | 6/2006 | Albornoz | G06F 3/0483 715/205 |
| 2006/0168513 A1* | 7/2006 | Coulson | G06F 17/2247 715/234 |
| 2006/0173999 A1* | 8/2006 | Rider | H04L 63/10 709/225 |
| 2006/0184867 A1* | 8/2006 | Shpigel | G06F 17/2229 715/206 |
| 2006/0259854 A1* | 11/2006 | Walker | G06F 17/2229 715/234 |
| 2007/0028162 A1* | 2/2007 | Griffin | G06F 16/958 715/235 |
| 2007/0043666 A1* | 2/2007 | Burdette | G06Q 20/108 705/42 |
| 2007/0043686 A1* | 2/2007 | Teng | G06F 16/83 |
| 2007/0044012 A1* | 2/2007 | Suver | G06F 17/2229 715/205 |
| 2007/0050403 A1* | 3/2007 | Dhairyawan | G06F 17/21 |
| 2007/0094286 A1* | 4/2007 | Murthy | G06F 16/86 |
| 2007/0130157 A1* | 6/2007 | Jain | G06F 16/24562 |
| 2007/0136662 A1* | 6/2007 | Khaba | G06F 17/2229 715/202 |
| 2007/0143320 A1* | 6/2007 | Gaurav | G06Q 20/14 |
| 2007/0143610 A1* | 6/2007 | Machiraju | G06Q 10/10 713/169 |
| 2007/0150809 A1* | 6/2007 | Yoshida | G06F 17/2229 715/235 |
| 2007/0156768 A1* | 7/2007 | Harrington | G06F 17/2229 |
| 2007/0174486 A1* | 7/2007 | Holstege | G06F 16/958 709/246 |
| 2007/0203931 A1* | 8/2007 | Ukelson | G06F 17/2247 |
| 2007/0236742 A1* | 10/2007 | Hale | G06F 17/2229 358/3.13 |
| 2007/0244860 A1 | 10/2007 | Carlson et al. | |
| 2007/0260650 A1* | 11/2007 | Warner | G06F 16/80 |
| 2007/0260971 A1* | 11/2007 | Rivas | G06F 17/2229 |
| 2007/0271523 A1* | 11/2007 | Lacey | G06F 8/38 715/762 |
| 2007/0283246 A1* | 12/2007 | Wake | G06F 17/2229 715/234 |
| 2007/0299969 A1* | 12/2007 | Kunitake | G06F 16/93 709/225 |
| 2008/0005132 A1* | 1/2008 | Herbeck | G06F 17/2205 |
| 2008/0005138 A1* | 1/2008 | Gauthier | G06F 17/2247 |
| 2008/0005194 A1* | 1/2008 | Smolen | G06F 16/2308 |
| 2008/0005659 A1* | 1/2008 | Fujimaki | G06F 17/2211 715/234 |
| 2008/0018925 A1* | 1/2008 | Smithson | G06F 21/57 358/1.13 |
| 2008/0021916 A1* | 1/2008 | Schnelle | G06F 16/86 |
| 2008/0059448 A1* | 3/2008 | Chang | G06F 21/62 |
| 2008/0065671 A1* | 3/2008 | Dejean | G06F 17/2229 |
| 2008/0072141 A1* | 3/2008 | Hodel-Widmer | G06F 17/24 715/255 |
| 2008/0077606 A1* | 3/2008 | Fang | G06F 17/2252 |
| 2008/0077850 A1* | 3/2008 | Gauthier | G06F 17/218 715/234 |
| 2008/0080017 A1* | 4/2008 | Ishizuka | G06F 17/2288 358/452 |
| 2008/0091623 A1* | 4/2008 | Idicula | G06F 16/8365 705/400 |
| 2008/0091693 A1* | 4/2008 | Murthy | G06F 17/2247 |
| 2008/0091703 A1* | 4/2008 | Murthy | G06F 16/83 |
| 2008/0091714 A1* | 4/2008 | Idicula | G06F 16/83 |
| 2008/0092037 A1* | 4/2008 | Medi | G06F 17/2247 715/237 |
| 2008/0140705 A1* | 6/2008 | Luo | G06F 17/2247 |
| 2008/0183736 A1* | 7/2008 | Westerinen | G06F 16/986 |
| 2008/0222516 A1* | 9/2008 | Petri | G06F 17/227 715/236 |
| 2008/0256092 A1* | 10/2008 | Kano | G06F 17/211 |
| 2008/0319954 A1* | 12/2008 | Boettiger | G06F 16/951 |
| 2008/0319999 A1* | 12/2008 | Simpson | G06F 21/604 |
| 2009/0063951 A1* | 3/2009 | Rjaibi | G06F 16/83 715/234 |
| 2009/0070295 A1* | 3/2009 | Otomori | G06F 17/2247 |
| 2009/0178019 A1* | 7/2009 | Bahrs | G06F 21/62 717/104 |
| 2010/0070844 A1* | 3/2010 | Aymeloglu | G06F 3/0484 715/229 |
| 2011/0047193 A1* | 2/2011 | Murthy | G06F 16/83 707/812 |
| 2012/0096346 A1* | 4/2012 | Sylthe | G06F 17/217 715/254 |
| 2016/0026731 A1* | 1/2016 | Murthy | G06F 17/2247 707/694 |

FOREIGN PATENT DOCUMENTS

| | | |
|---|---|---|
| WO | WO 00/14632 A1 | 3/2000 |
| WO | WO 00/49533 A2 | 8/2000 |

(56) References Cited

FOREIGN PATENT DOCUMENTS

| WO | WO 01/059602 A1 | 8/2001 |
|---|---|---|
| WO | WO 01/61566 A1 | 8/2001 |

OTHER PUBLICATIONS

Madore, David, "GCFS: a Garbage-Collected File system for Linux", Feb. 2000, 15 pages.
Mellande, "Unix File system Security", Jun. 2002, 26 pages.
Callaghan, et al., "NFS Version 3 Protocol Specification", RFC 1813, Jun. 1995, 93 pages.
Ricardo, Catherine, Database Systems: Principles, Design, & Implementation, 1990, MacMillian Publishing co., pp. 357-361, 379-380.
Vorthmann, Scott et al. "Beyond Schemas, Schema Adjuncts and the Outside World," Markup Languages, Online!, vol. 2, No. 3, Jun. 2000, pp. 1-8.
Arnold-Moore, Tim et al., "Architecture of a Content Management Server for XML Document Application," Web information Systems Engineering 2000, IEEE Computer Society—vol. 1, Jun. 19, 2000, XP010521842, pp. 97-108.
Sato, Hiroyuki et al., "Hyperclip: A Tool for Gathering and Sharing Meta-Data on User's Activities by Using Peer-to-Peer Technology," NTT Corporation—May 2002, retrieved from the internet at http://www.cs.rutgers.edu/{shklar/www11/final-submissions/paper12.pdf, retrieved on Jan. 29, 2007, 5 pages.
Wilde, Erik et al., "From Content-centered Publishing to a Link-based View of Information Resources," Proceedings of the $33^{rd}$ Annual Hawaii International Conference—Jan. 4-7, 2000, XP010545318, pp. 1-10.
Wollschlaeger, Martin et al., "XML based Description Model as a Platform for Web-based Maintenance," Industrial Informatics Conference 2004, XP010782616, pp. 125-130.
Al-Khalifa, Shurug et al., "Structural Joins: A Primitive for Efficient XML Query Pattern Matching", Feb. 26-Mar. 1, 2002, Data Engineering, 2002. Proceedings. $18^{th}$ International Conference, pp. 141-152.
Bourret, R. et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.
Braga, Daniele et al., "A Graphical Environment to Query XML Data with Query," Proceedings of the Fourth International Conference on Web Information Systems Engineering (WISE '03), 2003, IEEE, 10 pages.
Chae, Mi-Ok et al., "Design and Implementation of an Object-Oriented Multimedia DBMS Tightly Coupled with Information Retrieval Functions," Proc. $17^{th}$ IASTED International Conference on Applied Informatics, Feb. 15-18, 1999, abstract.
Chakraborty, Krishnendu, "The XML Garbage Collector", The Source for Developers, Sun Developer Network Site XP-002297849, Mar. 2002, [online], retrieved Apr. 14, 2005, retrieved from the internet: < URL: http://developers.sun.com/solaris/articles/xml_garbage_collector.html>, pp. 1-6.
Chen, Ruey-Shun et al., "Developing an XML framework for metadata system", Trinity College Dublin, Proc. of the $1^{st}$ Inter. Sympo. on Information and Communication, pp. 267-272.
Cheng, Josephine et al., "IBM DB2 XML Extender," IEEE, ICDE '00 Conference, San Diego, Feb. 2000, 139 pages.
Fundulaki et al., "Specifying Access Control Policies for XML Documents with Xpath", SACMAT '04 Proceedings of the ninth ACM symposium on Access Control models and technologies, pp. 61-69, dated Jun. 2-4, 2004.
Jajodia, Sushil et al., "Toward a Multilevel Secure Relational Data Model," ACM, 1991, 8393 SIGMOD Record, Jun. 20, 1991, No. 2, New York, US, XP 000364619, pp. 50-59.
Manolescu, Dragos, Review of "Metadata solutions: using metamodels, repositories, XML, and enterprise portals to generate information on demand by Adrienne Tannebaum", Mar. 2003, ACM Press, vol. 28, Issue 2, p. 38.
Noser, Hansrudi et al., Dynamic 3D Visualization of Database-Defined Tree Structures on the WWW by Using Rewriting Systems, 2000, IEEE, XP-002262516, pp. 247-254.
Oracle Corporation, "Oracle® iFS (Internet File System," Technical Data Sheet, Mar. 1999, XP-002204710, pp. 1-3.
Rao, Herman Chung-Hwa et al., "An Overview of the Internet File System," 1997, IEEE, XP-002204711, pp. 474-477.
W3C, "XML Inclusions (XInclude) Version 1.0 (Second Edition)", Copyright W3C, W3C recommendation dated Nov. 15, 2006, 20 pages.
OASIS Standard; "eXtensible Access Control Markup Language (XACML) Version 2.0"; http://docs.oasis-open.org/xacml/2.0/access_control-xacml-2.0-core-spec-os.pdf, dated Feb. 2.
OASIS Standard; "Hierarchical Resource Profile of XACML v2.0", http://docs.oasis-open.org/xacml/2.0/access_control-xacml-2.0-hier-profile-spec-os.pdf, dated Feb. 1, 2008, 18 pages.
OASIS Standard; "Multiple Resource Profile of XACML v2.0", http://docs.oasis-open.org/xacml/2.0/access_control-xacml-2.0-mult-profile-spec-os.pdf; dated Feb. 1, 2005, 14 pages.
Wilde et al., "From Content-centered Publishing to a Link-based view of Information Resources", Proceedings of the 33rd Hawaii International Conference on System Sciences, dated 2000, 10 pages.
U.S. Appl. No. 11/807,939, filed May 29, 2007, Office Action, dated Jun. 18, 2010.
U.S. Appl. No. 11/807,939, filed May 29, 2007, Final Office Action, dated Nov. 12, 2010.
U.S. Appl. No. 11/807,939, filed May 29, 2007, Final Office Action, dated Aug. 8, 2011.
U.S. Appl. No. 11/807,939, filed May 29, 2007, Office Action, dated Mar. 27, 2013.
U.S. Appl. No. 11/807,939, filed May 29, 2007, Advisory Action, dated Oct. 31, 2013.
U.S. Appl. No. 11/807,939, filed May 29, 2007, Final Office Action, dated Mar. 10, 2014.
U.S. Appl. No. 11/807,939, filed May 29, 2007, Final Office Action, dated Nov. 4, 2014.
U.S. Appl. No. 11/807,939, filed May 29, 2007, Notice of Allowance, dated Jun. 30, 2015.

\* cited by examiner

MANAGING COMPOUND XML DOCUMENTS IN A REPOSITORY

RELATED APPLICATIONS

This application is a Continuation of U.S. patent application Ser. No. 11/807,939, filed May 29, 2007, which claims priority to U.S. Provisional Application No. 60/829,652 filed on Oct. 16, 2006, the entire contents of both of which are incorporated herein by reference for all purposes as if fully set forth herein. The Applicant hereby rescinds any disclaimer of claim scope in the parent application or the prosecution history thereof and advises the USPTO that the claims in this application may be broader than any claim in the parent application.

FIELD OF THE INVENTION

The present invention relates to managing large XML documents.

BACKGROUND

XML documents are being increasingly stored and managed within content repositories. These content repositories are typically based on a database system and offer file system abstractions such as foldering, access control, versioning and protocol access.

The size of the individual XML documents has also been growing. XML documents can be as large as multi-megabytes and are expected to grow significantly over time.

For large documents, it may be desirable to apply different access control policies for different parts of the document. For example, in the case of a XML document representing a book, the editor may have write access on the entire book whereas individual writers can only update their assigned chapters. However, since access control in a repository may only be provided at the document level, it is difficult to provide access control level of a granularity lower than the document level.

Similar issues with granularity afflict other repository functions. With respect to versioning, only an entire document, rather than a portion thereof, may need to be versioned. When only a small part of a document changes to create a new version of the document, an entire new version of the document is created. Similarly, when updating a small portion of a large document, the entire document is overwritten.

Clearly, there is need for a mechanism that addresses these problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
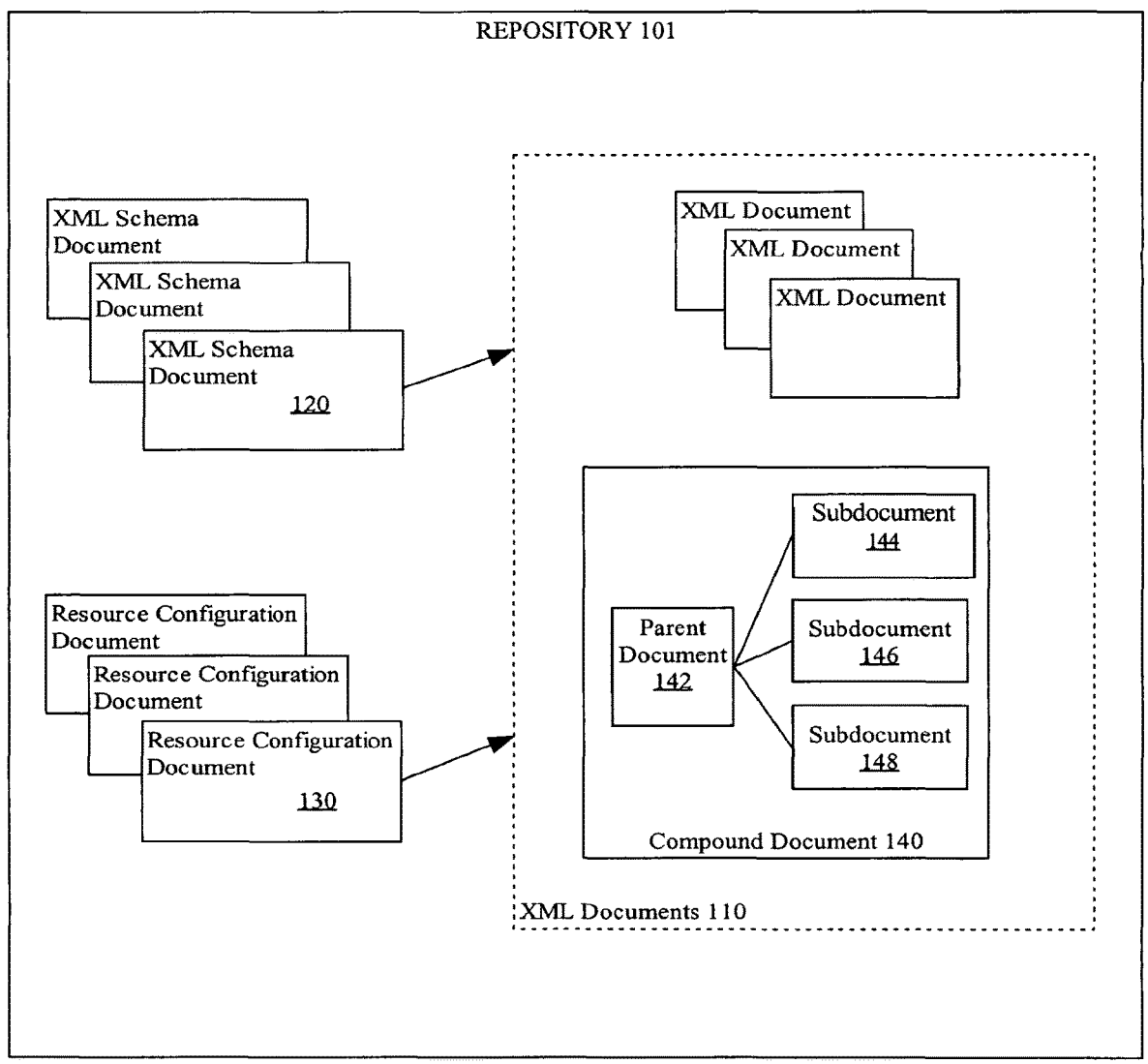
FIG. 1 is a diagram depicting a repository that stores compound documents according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is a declarative mechanism to manage large documents within a repository. The large documents are sectioned into subdocuments that are linked together by a parent document. The combination of the parent document and subdocuments is referred to as a compound document. There are multiple options for configuring rules to break up a source document into a compound document and naming the subdocuments. The compound documents may be queried using statements that treat the compound document as a single XML document, or the parent document and subdocuments may be queried and treated independently. Access control and versioning can be applied at the finer granularity of the subdocument.

Providing such a declarative mechanism that configures how compound documents are managed in the repository has advantages over other possible techniques, such as the application custom code approach, which requires applications of the repository to be programmed with logic that handles compound documents. In the application custom code approach, developers develop complicated procedural code. However, using declarative mechanisms described herein, developers can control how compound documents are managed using a much easier to program declarative mechanism. The declarative mechanism makes the repository aware of the relationship between the documents that comprise a compound document, and thus can ensure that the documents are processed in a way that is consistent with the relationship. Finally, the programmed logic that manages compound documents is consistent across all applications.

Illustrative Repository

A repository is a computer system that stores and manages access to resources. Specifically, a repository is a combination of integrated software components and an allocation of computational resources, such as memory, disk storage, a computer, and processes on the node for executing the integrated software components on a processor, the combination of the software and computational resources being dedicated to managing storage and access to resources.

A resource is a data source. The term resource encompasses a broad range of kinds of data sources. A resource can simply be a file, and/or, importantly, an XML document, which can be stored in a file or stored in the tables of an object-relational database system. A resource may also be a CGI script, that, when executed, dynamically generates data.

Similar to a hierarchical file system, resources in a repository are organized according to a hierarchy referred to herein as a resource hierarchy. Each resource may be located, identified, or addressed by tracing a "path" through the hierarchy to the resource. For a given resource, a path begins at a root directory and proceeds down a hierarchy of directories to eventually arrive at the directory that contains the resource. A repository may associate more than one path with a resource.

A repository is typically part of an n-tier system, where the repository is in the first tier and one or more applications are in the outer tier. An application, as the term is used herein, is a unit of software that is configured to interact with and use the functions of a repository. In general, applications are comprised of integrated functions and software modules (e.g. programs comprised of machine executable code or interpretable code, dynamically linked libraries) that perform a set of related functions. The applications are configured to interact with a repository by establishing a connection to the repository through one or more interface components configured for interfacing to the repository. Often, but not necessarily, an application and repository are located on different computers; the connection to the repository includes a network connection to the repository.

FIG. 1 shows a repository that may be used to implement an embodiment of the present invention. Referring to FIG. 1, it depicts repository 101, which stores XML documents 110. XML documents can be stored in structures within or outside of a database, in any form, such as CLOB (character LOB storing the actual XML text), O-R (object relational structured form in the presence of an XML schema), or BLOB (binary LOB storing some binary form of the XML data).

XML schema documents 120 define the structure of at least a portion of XML documents 110. A format and standard for an XML schema document is XML Schema.

A repository stores XML documents in base structures that comprise an "internal representation" of the XML document. The base structures are comprised of structures having a datatype recognized by repository 101. Different examples of base structures that repository 101 might use are object-relational storage (tables, columns, objects and object attributes), LOB, CLOB, and BLOB.

According to an embodiment, at least some of XML schema documents 120 are registered with repository 101. When an XML schema is registered, the database system determines an internal representation and stores instances of the XML schema within the base structures of the internal representation. When an XML document is received by repository 101 to be stored as an instance of the XML schema, repository 101 may validate the XML document to determine whether the document conforms to the XML schema.

Resource configurations 130 are units of declarative instructions that can be supplied, at least in part, by a user to the repository and is associated with a set of resources, such as resources that reside in a particular directory. Each resource configuration contains one or more configuration items that each declaratively define and/or expresses one or more rules for managing a resource associated with a resource configuration.

Compound documents may be accessed in repository 101 by issuing a query to repository 101. In an embodiment, the queries are statements that comply with one or more query languages, such as SQL, SQL/XML, or XQuery, or a combination thereof.

The term query as used herein refers broadly to any statement issued to repository 101 to access or change resources stored therein. Query statements that specify changes or modifications or creation of resources are referred to herein as DML (Data manipulation language) statements. Such operations are referred to herein as DML operations.

Compound Document

Among XML schema documents 120 is compound document 140. A compound document is an XML document that is composed of other XML documents.

As the term is used herein, an XML document is a set of elements that conform to XML, and that is a unit that may be identified and addressed by a resource path expression. A resource path consists only of directories and/or nodes within a resource hierarchy. The resource path does not include any element within an XML document. Parts of an XML document may be identified by, for example, a XPath expression based on the hierarchy of elements in the XML document. Thus a particular part of an XML document may be identified by a resource path expression and XPath expression. An XML document may or may not conform to the Document Object Model promulgated by the W3C.

Compound document 140 comprises a logical or parent XML document ("parent XML document") that contains subdocument links to subdocuments. Specifically, compound document 140 includes parent document 142 and subdocuments 144, 146, and 148. In general, subdocument links are data embedded in a parent document to identify a subdocument of the parent document.

According to an embodiment, a parent XML document includes subdocument links in the form of a linking element, which uses attributes and elements in the XInclude namespace, defined by the W3C standard for representing linking relationships between documents. (See XML Inclusions (XInclude) Version 1.0 (Second Edition W3C Recommendation 15 Nov. 2006) The following XML fragment XInclude XI A illustrates such a linking element.

| XInclude XI |
|---|
| <book xmlns:xi="http://www.w3.org/2001/XInclude"><br>  <xi:include href="frontmatter.xml"/><br>  <xi:include href="part1.xml"/><br>  <xi:include href="part2.xml"/><br>  <xi:include href="part3.xml"/><br>  <xi:include href="backmatter.xml"/><br></book> |

The link element <book> references the namespace XInclude and includes five "xi:include" elements, each containing an attribute referencing a subdocument. The subdocuments are frontmatter.xml, part1.xml, part3.xml, and backmatter.xml.

As mentioned earlier, compound document declarations declaratively specify how a repository processes compound documents. According to an embodiment, compound document declarations may be included within a resource configuration or as annotations within an XML schema document.

Creating a Compound Document

Compound documents can be created explicitly or implicitly. In the explicit approach, a parent document containing a linking element is submitted to the repository by an application and/or user. For example, an application supplies the parent document and subdocuments, with the parent document already containing the subdocument links to the subdocuments. This feature allows the application to not only shred a source document into parent document and subdocuments but also to make repository 101 aware that these XML documents comprise a compound document.

In the implicit approach, a compound document is created by shredding a document into a parent document and subdocument according to shredding instructions. Shredding instructions are compound document declarations that specify how to create compound document from a source document. Shredding instructions may also specify how to create a resource path and/or name for the subdocument. Like compound document declarations in general, shredding instructions may be specified by users in various ways. Two such ways are to include shredding instructions in a resource configuration and/or a XML schema, as illustrated below by the following XML fragments.

| Resource Configuration Fragment RC |
| --- |
| <SectionConfig><br>    <SectionPath value="//chapter" section="document"<br>        documentPath="concat("chapters/chap",<br>    chapter/@id,".xml"/> . . . |

| Schema Fragment SF |
| --- |
| <xs:element ref="chapter" xdb:section="document"<br>    xdb:documentPath="concat("chapters/chap",<br>    chapter/@id, ".xml")"/> |

Resource Configuration Fragment RC

Resource Configuration Fragment RC shows a fragment within an element of a resource configuration. Element <SectionConfig> contains shredding instructions. Within <SectionConfig>, <SectionPath> specifies locations within a source document that contain the content of subdocuments and a resource path and/or name of the document. Specifically, the attribute value is set to the XPath string expression "//chapter", which identifies elements containing subdocument content. Each element identified by the XPath string expression contains the content of a subdocument. The attribute value documentPath is set to a XPath string expression "concat("chapters/chap", chapter/@id, ".xml")" which, for a particular element identified by the path expression, is an XPath expression that evaluates to a resource path and name of a subdocument.

Schema Fragment SF shows a declaration annotated with shredding instructions for source documents that are instances of the XML schema. The value of attribute ref specifies locations within a source document that contain the content of subdocuments and a path and/or name of the document. Specifically, the attribute value is set to the "chapter ", identifying the elements within XML schema instances that contain subdocument content. The attribute value documentPath is set to the XPath string expression "concat ("chapters/chap", chapter/@id,".xml")" which is a XPath expression that evaluates to a resource path and name of a subdocument.

Creating Compound Documents Based on Shredding Documents

Figure 2:
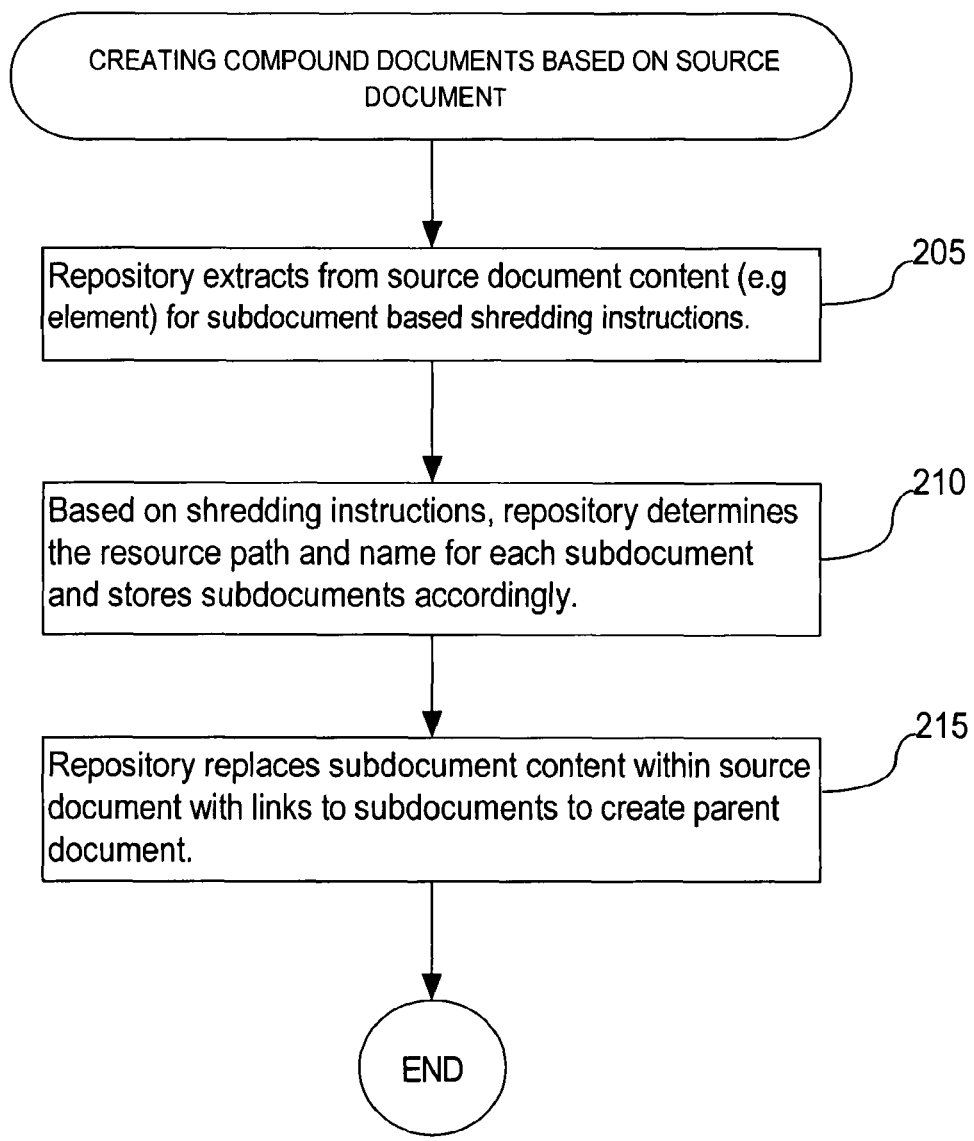
FIG. 2 is a flow chart depicting a procedure for creating a compound document according to an embodiment of the present invention.

FIG. 2 is a flow chart depicting a procedure for creating a compound document from a source document. According to an embodiment, the procedure is performed in response to an application submitting to repository 101 a source document for storing within repository 101.

Referring to FIG. 2, at 205, the repository 101 extracts from the source document the content for subdocuments, based on the shredding instructions. According to an embodiment, repository 101 may determine that the source document is associated with a resource configuration that contains the shredding instructions. For example, a user may specify a directory in which to store the source document. Repository 101 associates the directory and resources it contains with the resource configuration that contains shredding instructions. Repository 101 applies the resource configuration to the resources in the directory, including the shredding rules, in response to a request to store the source document.

In another embodiment, repository 101 determines that the source document specifies an XML schema document of which the source document is an instance. The XML schema document specifies shredding instructions. After validating the source document according to the XML schema, repository 101 applies the shredding rules specified in the XML schema document to generate the compound document.

At 210, repository 101 determines, based on the shredding instructions, the resource path and name of each of the subdocuments for which content was extracted, and creates and stores the subdocuments (with the extracted content) according to the resource path and/or name determined for each subdocument.

At 215, for each subdocument for which content was extracted, repository 101 replaces the content of the subdocument within the source document with a subdocument link to the subdocument. According to an embodiment, the content is replaced with a link element that conforms to XInclude and which refers to the resource path of each subdocument created and stored earlier in the procedure. After the replacement, the source document, as modified becomes a parent document for the compound document.

In another embodiment, a compound document is not created by repository 101 by shredding a source document according to shredding rules. Rather, repository 101 receives the compound document in an explicit mode. For example, an application supplies the parent document and subdocuments, with the parent document already containing the subdocument links to the subdocuments. This feature allows the application itself to shred a source document into a parent document and subdocuments and to make repository 101 aware that these documents comprise a compound document.

Hard, Weak, and Symbolic Linking

According to an embodiment of the present invention, the subdocument link between a parent document and a subdocument may be hard, weak, or symbolic. A hard link is uniquely associated with a subdocument. If the subdocument is moved to another location within repository 101, the hard link between the subdocument is preserved. Also, the integrity of the link is guaranteed. The subdocument cannot be deleted from repository 101 as long as the link exists.

A weak link is similar to a hard link. The subdocument is uniquely associated with the link. However, the integrity of the weak link is not guaranteed like it is for the hard link. Repository 101 does not prevent a subdocument from being deleted from repository 150 even if the parent has a link to it.

A symbolic link is not uniquely associated with a subdocument but is associated with a location e.g. resource path location. The symbolic link links a parent document with the subdocument (or other resource) at that location. Thus, if the subdocument symbolically linked to a parent document is moved to a different location within the repository 101, the symbolic link no longer links the subdocument and parent document, or, in other words, no longer points to the subdocument. However, if another subdocument is moved to the location, then the symbolic link points to the new subdocument thereby linking the new subdocument with the parent document.

According to an embodiment, for a hard or weak link between a parent document and subdocument, repository 101 stores a resource identifier that uniquely identifies the subdocument within a resource hierarchy stored in repository 101. The resource identifier is stored within the internal representation of the parent document in association with data representing the parent-document-subdocument link. The resource id of a resource, such as a patent document or subdocument, does not change once the resource is created in repository 101 and when the resource is moved within the repository 101, e.g. the resource path location of the resource is changed by moving it to a different directory.

As an optimization, the resource path string is also stored in association with the parent-document-subdocument link. In an embodiment, the resource path string may be used to access the subdocument more efficiently. The resource path string however, is not maintained when the respective subdocument is moved to another location. When the resource path string is used to access a subdocument, and the subdocument is not found at that location, repository 101 uses the resource id to find the subdocument. When found, the new resource path string is stored to replace the old and no longer valid resource path string.

The particular type of subdocument links (hard, weak and symbolic) to include in the parent document may be declared using compound document declarations. Just as in the case of shredding instructions, such compound document declarations may include elements, attributes, and an XPath string expression to indicate the particular kind of subdocument link to use for particular subdocuments.

Expand_Xinclude Operator

An important operation performed on a parent document is expansion. As used herein, the term expand refers to operations in which a subdocument link within a parent document is replaced with the content of a subdocument. Expanding a compound document is an operation that is performed in variety on contexts that require computation of the content, including, computing the result of a query that requests the content, or computing an intermediate result of a query that requires the content. The term expand a compound document and expand a parent document means to expand the subdocuments within the compound or parent document.

Compound documents may be accessed in repository 101 by issuing a query that contains an operator. The operator may be defined by a query language, and takes a parent document as an operand, and returns and/or evaluates to the expanded form of the parent document.

According to an embodiment, such an operator is an EXPAND_XINCLUDE operator, which takes as an operand a reference to a parent document. Path expressions that are applied to the operator reference elements in the parent document and subdocument without having to refer to the resource path of the subdocument. In other words, the path expressions may reference any location within the logical compound document without having to account for or include the resource path of a subdocument. For example, the following query.

---
select extract(expand_xinclude('book.xml'),
'/chapter/name') from dual;
---

The above query selects elements from the compound document book.xml identified by the path string /chapter/name. The elements are stored in a subdocument. No reference is made to the resource path of the subdocument.

Other operands of the EXPAND_XINCLUDE operator include operands for specifying which subdocument links to expand. In this way, EXPAND_XINCLUDE may be used to expand only selected subdocument links.

A statement expression or construct for expansion is not limited to any particular type of syntax. Any expression that conforms to a recognizable syntax may be used.

Whether a repository treats a reference to a parent document as reference to the entire compound document may be controlled by user session setting with repository 101. In an embodiment, when a query references a parent document that is not contained in any operator or the like, repository 101 generates and/or returns the expanded form because a session setting specifies to treat references to a parent document as reference to the entire compound document. To prevent and/or control expansion, an operator is used.

Access Control

Access control can be defined at the subdocument level. Compound document declarations for controlling access may be specified as annotations in an XML schema or instructions in a resource configuration, and may specify access control policies at the subdocument level. Compound document declarations may define different sets of access privileges for different sets of users for different subdocuments of a compound document. For example, a group of users may be entitled to read an entire compound document. However, only one subgroup of the users may edit certain chapters and another subgroup may edit other chapters. Such a policy may be specified by compound document declarations in a resource configuration or XML schema document, using, for example, specific elements, attributes, and XPath string expressions to declare the particular access control to use for particular subdocuments.

When repository 101 receives a query that includes an expand operator, it only expands those subdocuments to which the compound document declarations permit the required access privilege. Likewise, other types of operations, such as updates or modifications, are similarly controlled.

In addition, compound document declarations may specify error messages to provide when a requested operation is not permitted or is attempted. Such an error message may be specified at both the compound document level and the subdocument level.

Updates to Compound Document

In DML statements issued to a repository to modify a compound document, the statements may either specify updates to the individual parent document or subdocuments of a compound document or updates to the compound document as a whole. In the latter case, the update commands may refer to an expansion operator that operates on a compound document. The following query is an example.

```
update resource_view
    set res =updatexml (expand_xinclude('book.xml'),
        '/chapter/name', 'newname')
    where path ='book.xml'
```

In addition, compound document declarations may specify and control update behavior of a compound document. When updates are made to a compound document, the compound document declarations may specify that the updated version overwrite the old version of a subdocument or that the changes are merged within the subdocument. Such update behavior may be specified at both the compound document level or subdocument level for specific subdocuments.

Versioning

In an embodiment, repository 101 supports versioning of compound documents, at the compound document level and/or subdocument level. A compound document may be modified and stored as another version of the entire compound document. Thus, a new version of the parent document and each subdocument may be stored in a repository when creating a new version of a compound document. Before and after modification, the compound document may be checked in and checked out. In this case, the parent document and each subdocument is checked in and checked out.

Versioning may be formed at the parent and subdocument level. A new version of a parent document may be created independently without creating a new version of any subdocument. A version of a parent document may be checked in and checked out without checking in or checking out any subdocument. Likewise, a new version of a subdocument may be created without creating a new version of the parent document and any subdocument. A subdocument may be checked in and checked out without checking in and checking out another subdocument or the parent document.

In addition, the subdocument links may be version independent or version specific. In a version independent link, when a subdocument link is expanded, it is expanded to the current version of a subdocument. Thus, when a compound document is expanded, each subdocument link to a subdocument that is version independent is expanded by returning the most current version of the subdocument.

In a version specific link, the subdocument link refers to a specific version of the document. When a subdocument link is expanded, the specific version referred to is returned. In an embodiment, repository 101 stores a version number in addition to a resource id within the internal representation of the subdocument link.

Compound document declarations may specify whether subdocument links are version independent or specific. This allows a configuration of versioning features that accommodate a variety of scenarios and that may be used in various combinations.

Compound document declarations may declare that a particular version of a compound document incorporate specific versions of subdocuments. For example, a first version of a parent document may incorporate version 5 of subdocument A and version 7 of subdocument B. A second version of the parent document may include version 6 of subdocument A and version 10 of subdocument B. The second version of the parent document retains the version specific links to version 5 of subdocument A and version 7 of subdocument B.

Compound document declarations may declare that a particular version of a compound document have version independent links to subdocuments, or even a combination of version specific and independent links. For example, the first version of a parent document may have a version specific link to version 5 of subdocument A and a version independent link to subdocument B. A second version of the parent document may have a version specific link to version 6 of subdocument A and a version independent link to subdocument B. Thus, the different versions of a compound document represented by the first and second version of the parent document include different versions of subdocument A but the same and latest version of subdocument B.

The particular of type versioning to use for a compound document may be specified by compound document declarations in a resource configuration or XML schema document, using, for example, specific elements, attributes, and XPath string expressions to declare the particular subdocument links (version specific or independent) to use for particular subdocuments and the subdocuments to which they apply.

Hardware Overview

Figure 3:
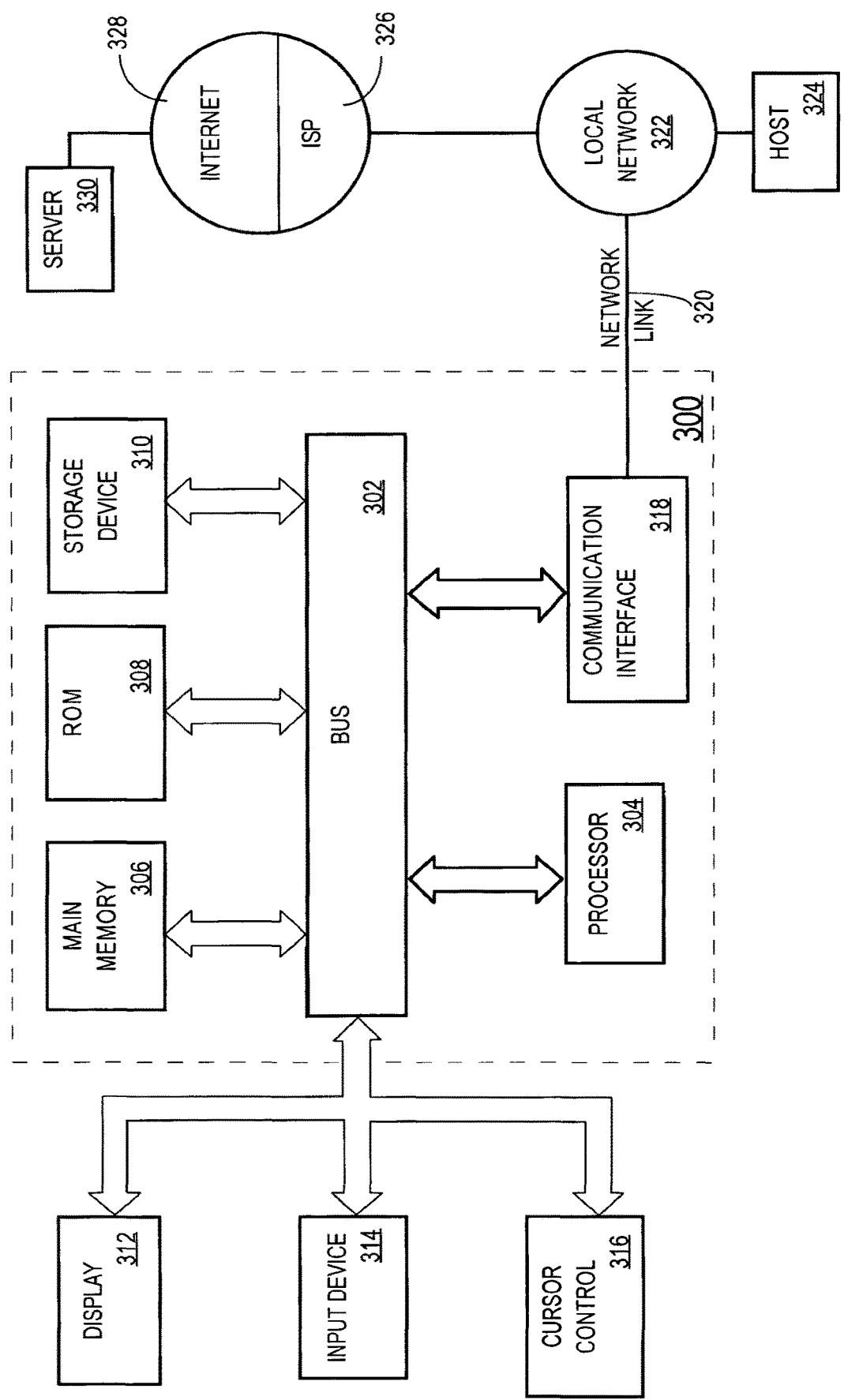
FIG. 3 is a diagram of a computer system that may be used to implement an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   in response to receiving a first source document:
   creating, based on the first source document, a first parent document that is separate from the first source document,
   identifying multiple elements within the first source document,
   creating a first plurality of subdocuments that are separate from the first parent document and the first source document,
   for each element of the multiple elements:
   storing said each element in a different subdocument of the first plurality of subdocuments,
   creating and storing, in the first parent document, a link to the different subdocument,
   storing data that identifies the first parent document and the first plurality of subdocuments as a particular compound document that is separate from the first source document;
   storing, within a repository, a plurality of compound documents that includes the particular compound document, each compound document of the plurality of compound documents including:
   a parent document,
   a plurality of subdocuments of the parent document;
   wherein the parent document includes, for each subdocument of the plurality of subdocuments, a link to said each subdocument;

creating an expanded view of a first compound document of the plurality of compound documents, wherein a link to a particular subdocument is replaced with content imported from the particular subdocument into the expanded view of the first compound document;

receiving an update to the expanded view of the first compound document, wherein applying the update changes content imported from the particular subdocument; and applying changes corresponding to the update to the particular subdocument that is stored separately from the expanded view of the first compound document without applying any of the changes to another subdocument of the first compound document.

2. The method of claim 1, wherein identifying the multiple elements comprises using an XML schema associated with the first source document to identify the multiple elements.

3. The method of claim 1, further comprising:
receiving a statement that requires that a particular operation be performed on content stored within a certain subdocument of the plurality of subdocuments; and
based on one or more compound document declarations that are stored separate from the plurality of compound documents, making a determination that the particular operation is not permitted.

4. The method of claim 3, wherein:
one of the one or more compound document declarations specifies an error message; and
the method further comprising displaying the error message in response to the determination.

5. The method of claim 1, further comprising:
storing, in association with a first compound document of the plurality of compound documents, a compound document declaration that declares at least one of the following:
a first link to at least one subdocument, of a set of first subdocuments of the first compound document, is a hard link, wherein a subdocument to which the hard link points cannot be deleted from the repository as long as the hard link is included in a parent document, and the link between the parent document and the subdocument is preserved if the subdocument is moved to another location within the repository;
a second link to at least one subdocument of the set of first subdocuments is a weak link, wherein a subdocument to which the weak link points can be deleted from the repository even while a parent document includes the weak link to the subdocument; and
a third link to at least one subdocument of the set of first subdocuments is a symbolic link, wherein a parent document that includes the symbolic link is no longer linked to a subdocument to which the symbolic link points if the subdocument is moved to a different location in the repository.

6. The method of claim 5, further comprising storing within a certain link of a certain parent document, a resource path to a certain subdocument, wherein the certain link is either a hard link or a weak link.

7. The method of claim 1, further comprising:
receiving a statement that requires that a particular operation be performed on content stored within a first subdocument of the plurality of subdocuments and a second subdocument of the plurality of subdocuments; and
based on one or more compound document declarations that are stored separate from the plurality of compound documents, making a determination that the particular operation is permitted for the first subdocument and is not permitted for the second subdocument.

8. The method of claim 1, further comprising:
determining that the first source document is to be stored in a particular location;
determining that the particular location is associated with one or more resource configurations;
wherein identifying the multiple elements comprises using the one or more resource configurations to identify the multiple elements.

9. The method of claim 1, wherein:
identifying the multiple elements comprises determining, based on one or more shredding instructions, a resource path and a name of each element of the multiple elements in the first source document;
storing said each element of the multiple elements comprises extracting said each element from the first source document based on the resource path and the name of said each element.

10. The method of claim 9, wherein the one or more shredding instructions are specified in XML.

11. One or more non-transitory storage media storing instructions which, when executed by one or more processors, cause:
storing data that (1) associates a first storage location with one or more first resource configurations that include first shredding instructions and (2) a second storage location with one or more second resource configurations that are different than the one or more first resource configurations and that includes second shredding instructions;
in response to receiving a first source document:
creating, based on the first source document, a first parent document that is separate from the first source document,
identifying multiple elements within the first source document, wherein identifying the multiple elements comprises (a) using the first shredding instructions included in the one or more first resource configurations to identify the multiple elements if the first source document is stored in the first storage location or (b) using the second shredding instructions included in the one or more second resource configurations to identify the multiple elements if the first source document is stored in the second storage location,
wherein the first source document is stored in the first storage location or the second storage location,
creating a first plurality of subdocuments that are separate from the first parent document and the first source document,
for each element of the multiple elements:
storing said each element in a different subdocument of the first plurality of subdocuments,
creating and storing, in the first parent document, a link to the different subdocument,
storing data that identifies the first parent document and the first plurality of subdocuments as a particular compound document that is separate from the first source document.

12. The one or more non-transitory storage media of claim 11, wherein identifying the multiple elements comprises using an XML schema associated with the first source document to identify the multiple elements.

13. The one or more non-transitory storage media of claim 11, wherein:
identifying the multiple elements comprises determining, based on one or more shredding instructions, a resource path and a name of each element of the multiple elements in the first source document;
storing said each element of the multiple elements comprises extracting said each element from the first source document based on the resource path and the name of said each element.

14. The one or more non-transitory storage media of claim 11, wherein the instructions, when executed by the one or more processors, further cause:
storing, within a repository, a plurality of compound documents that includes the particular compound document, each compound document of the plurality of compound documents including:
a parent document,
a plurality of subdocuments of the parent document;
wherein the parent document includes, for each subdocument of the plurality of subdocuments, a link to said each subdocument.

15. The one or more non-transitory storage media of claim 14, wherein the instructions, when executed by the one or more processors, further cause:
receiving a statement that requires that a particular operation be performed on content stored within a certain subdocument of the plurality of subdocuments; and
based on one or more compound document declarations that are stored separate from the plurality of compound documents, making a determination that the particular operation is not permitted.

16. The one or more non-transitory storage media of claim 15, wherein:
one of the one or more compound document declarations specifies an error message; and
the instructions, when executed by the one or more processors, further cause displaying the error message in response to the determination.

17. The one or more non-transitory storage media of claim 14, wherein the instructions, when executed by the one or more processors, further cause:
storing, in association with a first compound document of the plurality of compound documents, a compound document declaration that declares at least one of the following:
a first link to at least one subdocument, of a set of first subdocuments of the first compound document, is a hard link, wherein a subdocument to which the hard link points cannot be deleted from the repository as long as the hard link is included in a parent document, and the link between the parent document and the subdocument is preserved if the subdocument is moved to another location within the repository;
a second link to at least one subdocument of the set of first subdocuments is a weak link, wherein a subdocument to which the weak link points can be deleted from the repository even while a parent document includes the weak link to the subdocument; or
a third link to at least one subdocument of the set of first subdocuments is a symbolic link, wherein a parent document that includes the symbolic link is no longer linked to a subdocument to which the symbolic link points if the subdocument is moved to a different location in the repository.

18. The one or more non-transitory storage media of claim 17, wherein the instructions, when executed by the one or more processors, further cause storing within a certain link of a certain parent document, a resource path to a certain subdocument, wherein the certain link is either a hard link or a weak link.

* * * * *